United States Patent
Ogiwara (10) Patent No.: US 11,071,173 B2
(45) Date of Patent: Jul. 20, 2021

(54) COMMUNICATION DEVICE, COMMUNICATION SYSTEM, AND COMMUNICATION METHOD FOR SWITCHING COMMUNICATION CONNECTION

(71) Applicant: NEC Display Solutions, Ltd., Tokyo (JP)

(72) Inventor: Yusuke Ogiwara, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/497,318

(22) PCT Filed: Jun. 12, 2017

(86) PCT No.: PCT/JP2017/021603
§ 371 (c)(1),
(2) Date: Sep. 24, 2019

(87) PCT Pub. No.: WO2018/229815
PCT Pub. Date: Dec. 20, 2018

(65) Prior Publication Data
US 2020/0383174 A1    Dec. 3, 2020

(51) Int. Cl.
*H04W 84/12* (2009.01)
*H04W 92/18* (2009.01)
(Continued)

(52) U.S. Cl.
CPC ........... *H04W 92/18* (2013.01); *H04W 48/16* (2013.01); *H04W 76/10* (2018.02); *H04W 84/12* (2013.01); *H04W 88/06* (2013.01)

(58) Field of Classification Search
CPC ..... H04W 84/12; H04W 48/18; H04W 88/08; H04W 60/04; H04W 4/80; H04W 60/00;
(Continued)

(56) References Cited

U.S. PATENT DOCUMENTS

| 6,587,680 | B1* | 7/2003 | Ala-Laurila | ............ | H04L 63/08 455/411 |
| 2005/0197156 | A1* | 9/2005 | Fourquin | .......... | H04W 36/0072 455/553.1 |

(Continued)

FOREIGN PATENT DOCUMENTS

| JP | 2002-112347 A | 4/2002 |
| JP | 2002-311933 A | 10/2002 |

(Continued)

OTHER PUBLICATIONS

International Search Report (ISR) (PCT Form PCT/ISA/210), in PCT/JP2017/021603, dated Aug. 8, 2017.

*Primary Examiner* — Daniel Lai
(74) *Attorney, Agent, or Firm* — McGinn I.P. Law Group, PLLC.

(57) ABSTRACT

A communication device includes a communication part configured to establish a connection to either a first device or a second device, and a controller configured to control the communication part. The controller is configured to send a predetermined notice to the second device before disconnecting the connection with the second device in a predetermined operation mode to switch the connection from the second device to the first device, but the controller does not make the predetermined notice in other cases.

8 Claims, 5 Drawing Sheets

(51) Int. Cl.
*H04W 76/10* (2018.01)
*H04W 48/16* (2009.01)
*H04W 88/06* (2009.01)

(58) Field of Classification Search
CPC ..... H04W 76/15; H04W 76/19; H04W 76/30; H04W 88/06; H04W 48/14; H04W 48/20; H04W 24/02; H04W 76/10; H04W 80/10; H04W 36/08; H04W 76/20; H04W 36/14; H04W 36/0027; H04W 36/06; H04W 48/17; H04W 60/005; H04W 72/0406; H04W 72/1284; H04W 76/14; H04W 76/23; H04W 76/36; H04W 76/38; H04W 84/20; H04W 36/0033; H04W 36/03; H04W 4/30; H04W 4/50; H04W 76/25; H04W 88/085; H04W 88/10; H04W 92/045; H04W 92/20; H04W 92/18; H04W 48/16; H04W 76/34; H04N 1/00106; H04N 1/00307; H04N 1/00352; H04N 1/00392; H04N 1/2315; H04N 2201/0015; H04N 2201/0075; H04N 5/232; H04N 5/23219; H04N 5/23206; H04N 5/23216; H04N 7/12
See application file for complete search history.

(56) References Cited

U.S. PATENT DOCUMENTS

| | | | |
|---|---|---|---|
| 2012/0051324 A1* | 3/2012 | Hwang | H04W 80/04 370/331 |
| 2016/0302244 A1* | 10/2016 | Son | H04W 76/11 |
| 2018/0152973 A1* | 5/2018 | Ueno | G06F 21/608 |
| 2019/0116620 A1* | 4/2019 | Sanada | H04W 48/16 |

FOREIGN PATENT DOCUMENTS

| | | |
|---|---|---|
| JP | 2010-239449 A | 10/2010 |
| JP | 2013-236256 A | 11/2013 |
| JP | 2016-163076 A | 9/2016 |

* cited by examiner

COMMUNICATION DEVICE, COMMUNICATION SYSTEM, AND COMMUNICATION METHOD FOR SWITCHING COMMUNICATION CONNECTION

TECHNICAL FIELD

The present invention relates to a communication device, a communication system, a communication method, and a communication program.

BACKGROUND ART

For example, it is possible for users to enlarge and display screen images displayed on displays of transmission devices with display devices having larger displays when transmission devices (e.g. personal computers) configured to transmit video data are transmitting video data to display devices (e.g. projectors) configured to acquire video data and display videos. Accordingly, many users may share screen images.

It is possible to provide a technology to transmit video data to a display device like a projector through a wireless LAN (Local Area Network; a private branch communication network). According to this technology in which a display device has a reception function to receive video data or a display device is configured to communicate with a reception device having a reception function, a transmission device is configured to directly communicate with the reception device or the display device having a reception function (hereinafter, collectively referred to as "a wireless display system") without going through a wireless-LAN router.

When the transmission device communicates with other communication networks such as the Internet and intracompany networks (hereinafter, referred to as "existing networks") through a wireless LAN, the transmission device needs to change a connection setting of a wireless LAN in order to communicate with the wireless display system. Due to a change of the connection setting of a wireless LAN, the transmission device cannot communicate with the existing networks while communicating with the wireless display system. For this reason, users cannot use resources previously available on the existing networks (e.g. information open to the public on the Internet, services provided on intracompany networks, etc.). To use resources on the existing networks again by users, the transmission device needs to change a connection setting of a wireless LAN so as to communicate with the existing networks again. In this connection, Patent Document 1 discloses a technology for switching over wireless communication networks in use.

CITATION LIST

Patent Document

Patent Document 1: Japanese Patent Application Publication No. 2002-311933

SUMMARY OF INVENTION

Technical Problem

In general, the wireless display system may allow for concurrent communication with the limited number of transmission devices. In the wireless display system installed in a conference room gathering many users, for example, it is assumed that plenty of transmission devices, which is larger than the number of transmission devices allowing for concurrent communication, may request communication connections; hence, the wireless display system may have a function to automatically change a connection setting of a wireless LAN in each constant time. In this case, the wireless display system may automatically change a connection setting of a wireless LAN when a user temporarily switches over the connection setting of a wireless LAN in order that the transmission device can communicate with the existing networks like the Internet. This may raise a problem in which the user needs to make a connection setting of a wireless LAN again in order to display a video with the wireless display system again.

Considering the above problem, the present invention aims to provide a communication device, a communication system, a communication method, and a communication program which can simply switch the communication connection between the wireless display system and the existing network.

Solution to Problem

To solve the above problem, a communication device according to an aspect of the present invention includes a communication part configured to establish a connection to either a first device or a second device, and a controller configured to control the communication part. The controller is configured to send a predetermined notice to the second device before disconnecting the connection with the second device in a predetermined operation mode to switch the connection from the second device to the first device, but the controller does not make the predetermined notice in other cases.

In an aspect of the present invention, a communication device includes a communication part configured establish a connection to an external device, and a controller configured to change the connection setting information used for the connection to the external device at least on a condition that the connection is not established with the external device. The controller does not change the connection setting information even when the connection is not established with the external device or the controller increases a time to change the connection setting information when the communication part acquires a predetermined notice from the external device.

In an aspect of the present invention, a communication system includes at least a communication device, a first device, and a second device. The communication device includes a communication part configured to establish a connection to either the first device or the second device, and a controller configured to control the communication part. The controller is configured to send a predetermined notice to the second device before disconnecting the connection with the second device in a predetermined operation mode to switch the connection from the second device to the first device, but the controller does not make the predetermined notice in other cases. The first device includes a first communication part configured to establish a connection. The second device includes a second communication part configured to establish a connection and a second controller configured to change the connection setting information used for the connection with the communication device when a predetermined condition is satisfied at least on a condition that the connection is not established with the communication device. The second controller does not change the connection setting information irrespective of the predetermined condition when the second communication part acquires the predetermined notice.

In an aspect of the present invention, a communication method includes a communication step to establish a connection to either a first device or a second device, and a control step to send a predetermined notice to the second device before disconnecting the connection with the second device in a predetermined operation mode to switch the connection from the second device to the first device but not to make the predetermined notice in other cases.

In an aspect of the present invention, a communication program causes a computer to implement a communication step to establish a connection to either a first device or a second device, a first control step to control the communication step, and a second control step to send a predetermined notice to the second device before disconnecting the connection with the second device in a predetermined operation mode to switch the connection from the second device to the first device but not to make the predetermined notice in other cases.

In an aspect of the present invention, a communication method includes a communication step to establish a connection to an external device, a first control step to change the connection setting information used for the connection with the external device at least on a condition that the connection is not established with the external device, and a second control step not to change the connection setting information even when the connection is not established with the external device or to increase a time to change the connection setting information upon acquiring a predetermined notice from the external device.

Advantageous Effects of Invention

According to the present invention, it is possible to simply switch the communication connection between a receiver or a display device having a reception function and the existing network.

DESCRIPTION OF EMBODIMENTS

Hereinafter, the present invention will be described by way of embodiments, whereas the following embodiments do not necessarily limit the scope of the invention according to the appended claims. The following embodiments refer to combinations of features, all of which are not necessarily essential to solutions of the present invention. In the drawings, the same or similar parts are denoted by the same reference signs; hence, duplicate descriptions thereof will be omitted here. In the drawings, the shape and size of constituent elements may be expanded to clearly describe the embodiments.

First Embodiment

Hereinafter, the first embodiment of the present invention will be described below.

Process to Switch Over Communication Connection

Hereinafter, a process to switch the communication connection with a video display system 1 according to the present embodiment will be described with reference to the drawings.

Figure 1:
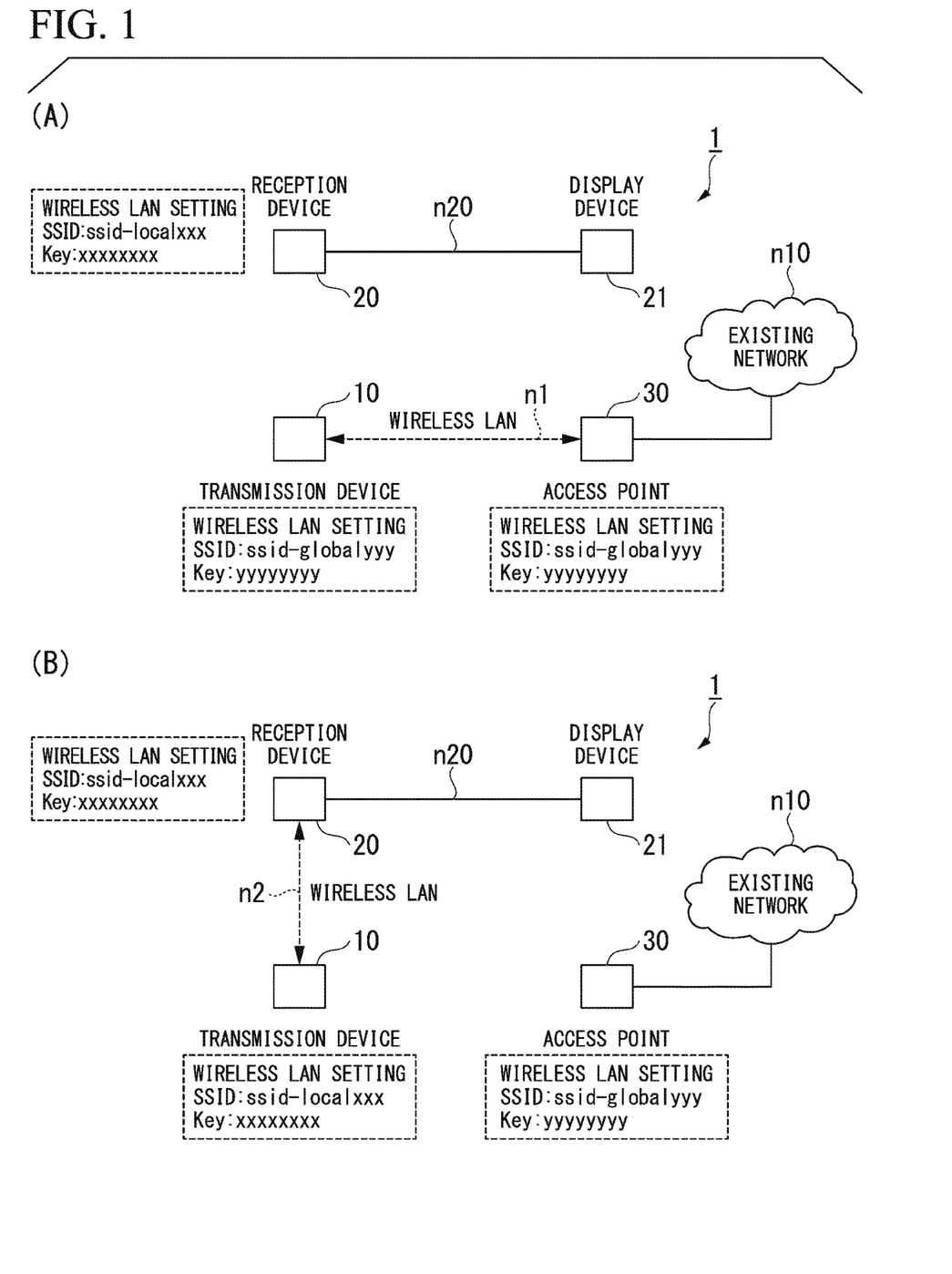
FIG. 1 is a schematic diagram showing an outline process to switch the communication connection with a video display system according to the first embodiment of the present invention.

FIG. 1 is a schematic diagram showing the outline process to switch the communication connection with the video display system 1 according to the first embodiment of the present invention.

FIG. 1(A) and FIG. 1(B) show examples of states relating to communication connections with the video display system 1 of the present embodiment. As shown in FIG. 1(A) and FIG. 1(B), the video display system 1 includes a transmission device 10, a reception device 20, a display device 21, and an access point 30.

The transmission device 10 is connectible to the access point 30 serving as an access point providing the communication connection to an existing network n10 through a wireless LAN n1 (see FIG. 1(A)).

The transmission device 10 is a computer apparatus connectible to the existing network n10 to use resources provided over the existing network n10. For example, the transmission device 10 may include a personal computer or a tablet-type mobile information terminal. For example, the access point 30 may include a wireless-LAN router. For example, the existing network n10 may be the Internet or an intracompany network.

The transmission device 10 is connectible to the reception device 20 through the wireless LAN n2 (see FIG. 1(B)).

The transmission device 10 is connected to the reception device 20 to transmit video data to the reception device 20.

The reception device 20 is connected to the display device 21 through a communication line n20. For example, the communication line n20 may include a video cable or the like.

The reception device 20 is connected to the transmission device 10 through a wireless LAN n2 so as to receive video data from the transmission device 10. The reception device 20 sends the received video data to the display device 21 through the communication line n20.

Upon receiving video data from the reception device 20, the display device 21 displays a video based on the video data. The display device 21 may include a projector (e.g. CRT (Cathode Ray Tube) projector or a liquid-crystal projector), or a display (e.g. a liquid-crystal display (LCD; Liquid-Crystal Display), an organic EL (Organic Electroluminescence) display, or a CRT).

The present embodiment is designed such that the reception device 20 is an independent device of the display device 21; but this is not a restriction. For example, it is possible to provide an integrated device made of the reception device 20 and the display device 21 such as a device having a reception function to receive video data from the transmission device 10 when the display device 21 is connected to the transmission device 10 through the wireless LAN n2.

As shown in FIG. 1(A) and FIG. 1(B), the access point 30 has a wireless LAN setting including SSID (Service Set Identifier) of "ssid-globalyyy" and Key (i.e. a security key) of "yyyyyyyy". In addition, the reception device 20 has a wireless LAN setting including SSID of "ssid-localxxx" and Key of "xxxxxxxx".

As shown in FIG. 1(A), the transmission device 10 is set to a wireless LAN setting including SSID of "ssid-globalyyy" and Key of "yyyyyyyy" allowing for the communication connection to the access point 30 through the wireless LAN n1. As shown in FIG. 1(B), it is possible to change the communication connection such that the transmission device 10 is changed to a wireless LAN setting including SSID of "ssid-localxxx" and Key of "xxxxxxxx" allowing for the communication connection to the reception device 20 through the wireless LAN n2.

Functional Configuration of Transmission Device

Hereinafter, the functional configuration of the transmission device 10 of the present embodiment will be described with reference to the drawing.

Figure 2:
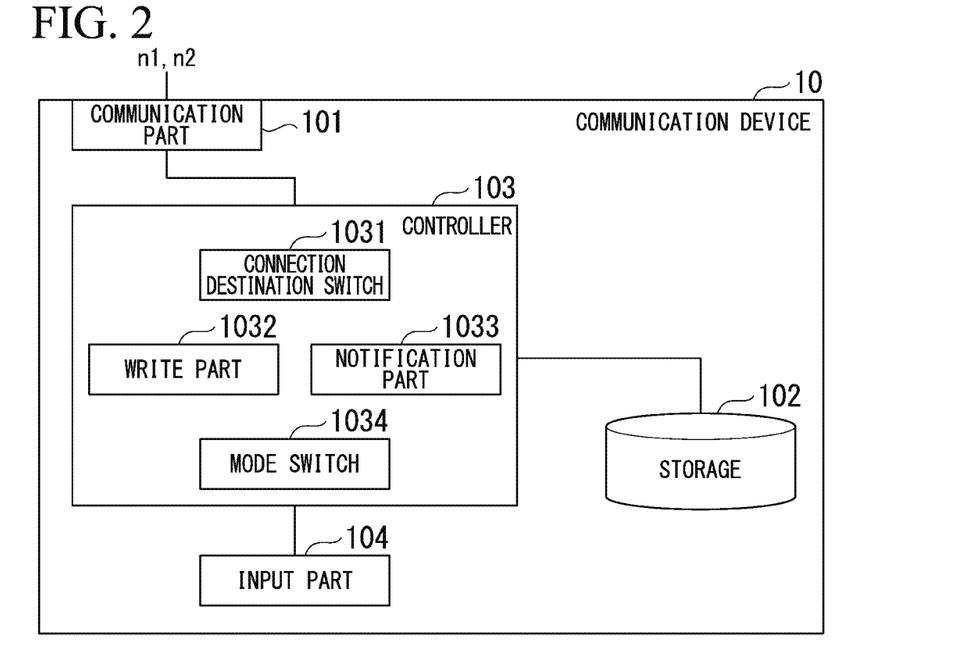
FIG. 2 is a block diagram showing the functional configuration of a transmission device according to the first embodiment of the present invention.

FIG. 2 is a block diagram showing the functional configuration of the transmission device 10 according to the first embodiment of the present invention. As show in FIG. 2, the transmission device (or a communication device) 10 includes a communication part 101, a storage 102, a controller 103, and an input part 104.

The communication part (or a first communication part) 101 carries out either the communication connection to the access point (or a first device) 30 serving as an access point to the existing network n10 through the wireless LAN n1 or the communication connection to the reception device (or a second device) 20 serving as an access point to the communication line n20 through the wireless LAN n2.

The reception device 20 serving as an access point to the communication line n20 may be changed in terms of a wireless LAN setting (or connection setting information) including a SSID and a security key, which is used for the communication part 101 to make the communication connection to the reception device 20, when no communication connection is established for the reception device 20.

The storage 102 is configured to store programs and data used for various processes to be implemented by the transmission device 10. In addition, the storage 102 can be used for a temporary storage area to be temporarily used in various processes executed by the transmission device 10. For example, the storage 102 may include a HDD (Hard Disk Drive), flash memory, an EEPROM (Electrically Erasable Programmable Read-Only Memory), a RAM (Random-Access Memory), a ROM (Read-Only Memory), or an arbitrary combination of those storage media.

In addition, the storage 102 is configured to store a wireless LAN setting (or connection setting information) used for the communication connection to the reception device 20 serving as an access point to the communication line n20 through the wireless LAN n2.

The controller 103 is configured to control various functional blocks in the transmission device 10. The controller 103 is configured to execute various processes in the transmission device 10 based on control programs and control data stored on the storage 102. For example, the controller 103 may include a CPU (Central Processing Unit).

In addition, the controller 103 includes a connection destination switch 1031, a write part 1032, a notification part 1033, and a mode switch 1034.

The connection destination switch 1031 is configured to switch the communication connection between the access point 30 serving as an access point to the existing network n10 and the reception device serving as an access point to the communication line n20.

The write part 1032 is configured to write a wireless LAN setting (or connection setting information) for establishing the communication connection to the reception device 20 on the storage 102 when the communication part 101 makes the communication connection to the reception device 20 serving as an access point to the communication line n20.

In a simple switching mode for switching the communication connection from the reception device (or a second device) 20 serving as an access point to the communication line n20 to the access point (or a first device) 30 serving as an access point to the existing network n10, the notification part 1033 transmits a temporary disconnect notice (or a predetermined notice), indicating a temporary disconnect of the communication connection to the reception device 20, to the reception device 20 through the communication part 101. Otherwise, the notification part 1033 does not transmit the temporary disconnect notice (or the predetermined notice) to the reception device 20.

The simple switching mode is a mode allowing for the connection destination switch 1031 to make the communication connection to the reception device 20 using the wireless LAN setting (or the connection setting information) stored on the storage 102 through the wireless LAN n2. For example, the transition to the simple switching mode occurs according to the input information applied to the input part 104 upon a user's input operation. For example, a user may cause the transition to the simple switching mode (or a predetermined operation mode) using a mouse, a keyboard, or a button of application software.

In another mode than the simple switching mode (or in a normal connection mode), it is possible to make the communication connection to the reception device 20 by making a wireless LAN setting again upon a user's input operation.

In the simple switching mode (or the predetermined operation mode) for switching the communication connection from the access point 30 serving as an access point to the existing network n10 to the reception device 20 serving as an access point to the communication line n20, the connection destination switch 1031 makes the communication connection to the reception device 20 using the wireless LAN setting (or the connection setting information) stored on the storage 102.

According to an external instruction, the mode switch 1034 switches over its mode between the simple switching mode, i.e. the operation mode for establishing the communication connection to the reception device 20 serving as an access point to the communication line n20 using the wireless LAN setting (or the connection setting information) which is written on the storage 102 by the write part 1032, and the normal connection mode, i.e. the operation mode for establishing the communication connection to the reception device 20 using the changed wireless LAN setting corresponding to the wireless LAN setting changed in the reception device 20. For example, the external instruction is input information which is input by the input part 104 upon a user's input operation using a keyboard or a mouse.

The controller 103 controls the communication part 101 to make the communication connection according to the mode switched over by the mode switch 1034 (e.g. the simple switching mode or the normal connection mode).

The input part 104 accepts a user's input operation (e.g. an input operation to instruct switching of the network subjected to the communication connection). In the simple switching mode (or the predetermined operation mode), the controller 103 switches over the communication connection from the access point (or a first device) 30 serving as an access point of the existing network n10 to the reception device (or a second device) 20 serving as an access point of the communication line n20 according to the input information representing an input operation accepted by the input part 104.

For example, the input part 104 may include any measures configured to accept a user's input operation such as a keyboard and a touch panel. In this connection, the input part 104 may further include an input button, a mouse, a pointing device, or a microphone.

For example, the transmission device having a display (not shown) may be equipped with a touch panel serving as a single member having an input/output function shared by the input part 104 and the display. In this case, the display is configured to display various types of information presented to a user of the transmission device 10.

In this connection, the input part 104 may be an input interface configured to accept a user's input operation when connected to an external input device (e.g. a keyboard or a touch panel). In addition, the display may be an output interface configured to output various types of information presented to a user of the transmission device 10 when connected to an external input device (e.g. a liquid-crystal display).

Functional Configuration of Reception Device

Hereinafter, the functional configuration of the reception device 20 according to the present embodiment will be described with reference to the drawing.

Figure 3:
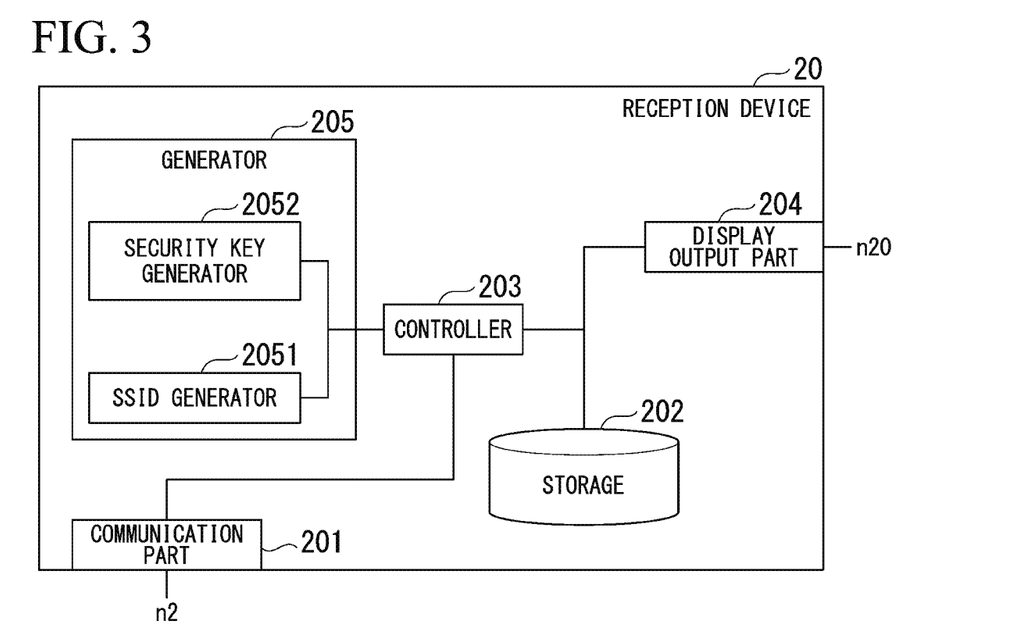
FIG. 3 is a block diagram showing the functional configuration of a reception device according to the first embodiment of the present invention.

FIG. 3 is a block diagram showing the functional configuration of the reception device according to the first embodiment of the present invention. As shown in FIG. 3, the reception device 20 includes a communication part 201, a storage 202, a controller 203, a display output part 204, and a generator 205.

The communication part 201 (or a second communication part) is a communication interface configured to communicate with the communication part 101 of the transmission device 10 through the wireless LAN n2.

The storage 202 is configured to store programs and data used for various processes implemented by the reception device 20. In addition, the storage 202 is used as a temporary storage area temporarily used for various processes implemented by the reception device 20. For example, the storage 202 may include a HDD, flash memory, an EEPROM, a RAM, a ROM, or combinations of those storage media.

The storage 202 stores an SSID generated by an SSID generator 2015 of the generator 205, which will be discussed later, and a security key generated by a security key generator 2052 of the generator 205, which will be discussed later.

The controller 203 controls various blocks of the reception device 20. The controller 203 carries out various processes of the reception device 20 based on control programs and control data stored on the storage 202. For example, the controller 203 may include a CPU.

The controller 203 (or a second controller) controls the generator 205 to generate a new SSID and a security key upon satisfying a predetermined condition (e.g. a predetermined time (e.g. one hour) being elapsed) on the condition that the reception device 20 is not connected to the transmission device 10 (or an external device) through the wireless LAN n2. Subsequently, the controller 203 (or a second controller) executes a connection setting information change process to change a wireless LAN setting (or connection setting information) used for communication with the transmission device 10 through the wireless LAN n2 with a new wireless LAN setting.

The controller 203 is set to a mode to temporary stop the connection setting information change process (or a connection retain mode for preventing the connection setting information change process regardless of the aforementioned predetermined condition) upon receiving (or acquiring) the aforementioned temporary disconnect notice (or a predetermined notice) from the transmission device 10 (or an external device) through the communication part 201. Subsequently, the controller 203 reverts to a mode to execute the connection setting information change process (i.e. a setting change mode) again when the reception device 20 is connected to the transmission device 10 through the wireless LAN n2 again.

The display output part 204 receives video data from the transmission device 10 through the wireless LAN n2 and outputs the video data to the display device 21 through the communication line n20.

The generator 205 generates the SSID and the security key (i.e. the connection setting information) according to an instruction from the controller 203. As shown in FIG. 3, the generator 205 includes the SSID generator 2051 configured to generate the SSID and the security key generator 2052 configured to generate the security key.

The transmission device 10 may transmit to the reception device 20 a notice representing transition to the simple switching mode due to the transition to the simple switching mode. In this case, it is possible for the transmission device 10 to omit the transmission process to transmit the temporary disconnect notice by reconfiguring the the reception device 20 to be shifted to the connection retain mode upon receiving the notice.

In this connection, the connection retain mode may not be necessarily equivalent to the mode to temporary stop the connection setting information change process, but the connection retain mode would be another mode to execute the connection setting information change process after a lapse of a sufficiently longer time than the setting change mode (i.e. a mode to increase the time until execution of the connection setting information change process).

Upon receiving the temporary disconnect notice through the communication part 201, the controller 203 may carry out an arbitrary process. For example, the controller 203 may carry out a process to temporarily stop a video displayed on the display device 21 upon receiving the temporary disconnect notice, or the controller 203 may carry out a process to prevent displaying a video to be displayed on the display device 21.

Even when the reception device 20 permits a plurality of transmission devices 10 to be connected thereto, it is possible to determine that the transmission devices 10 and the reception device 20 may be disconnected in communication due to disconnection of all the connections between the transmission devices 10 and the reception device 20. In other words, it is possible to determine that the transmission device 10 and the reception device 20 are connected in communication when at least one transmission device 10 among a plurality of transmission devices 10 is connected to the reception device 20.

When the reception device 20 permits a plurality of transmission devices 10 to be connected thereto, the entire screen of the display device 21 is divided into a plurality of subdivided screen areas in correspondence with the number of transmission device 10 connected to the reception device 20, wherein it is possible to display a screen image in each subdivided screen area based on video data transmitted from each transmission device 10.

In this case, even when one transmission device 10 sends a temporary disconnect notice to the reception device 20, the subdivided screen area for one transmission device 10 will be solely processed among a plurality of subdivided screen areas. That is, it is possible to temporarily stop the connection setting information change process for each transmission device 10 independently.

Considering that a plurality of transmission devices 10 are connected to the reception device 20, even when one transmission device 10 is shifted to the simple switching mode, other transmission devices 10 are not necessarily shifted to the simple switching mode; hence, an operation to switch the transmission device(s) 10 between the simple switching mode and the normal connection mode will be implemented for each transmission device 10.

In addition, the reception device 20 may operate depending on the operation of each transmission device 10 in either the setting change mode or the connection retain mode.

Operation of Transmission Device

Hereinafter, the operation of the transmission device 10 of the present embodiment will be described with reference to the drawing.

Figure 4:
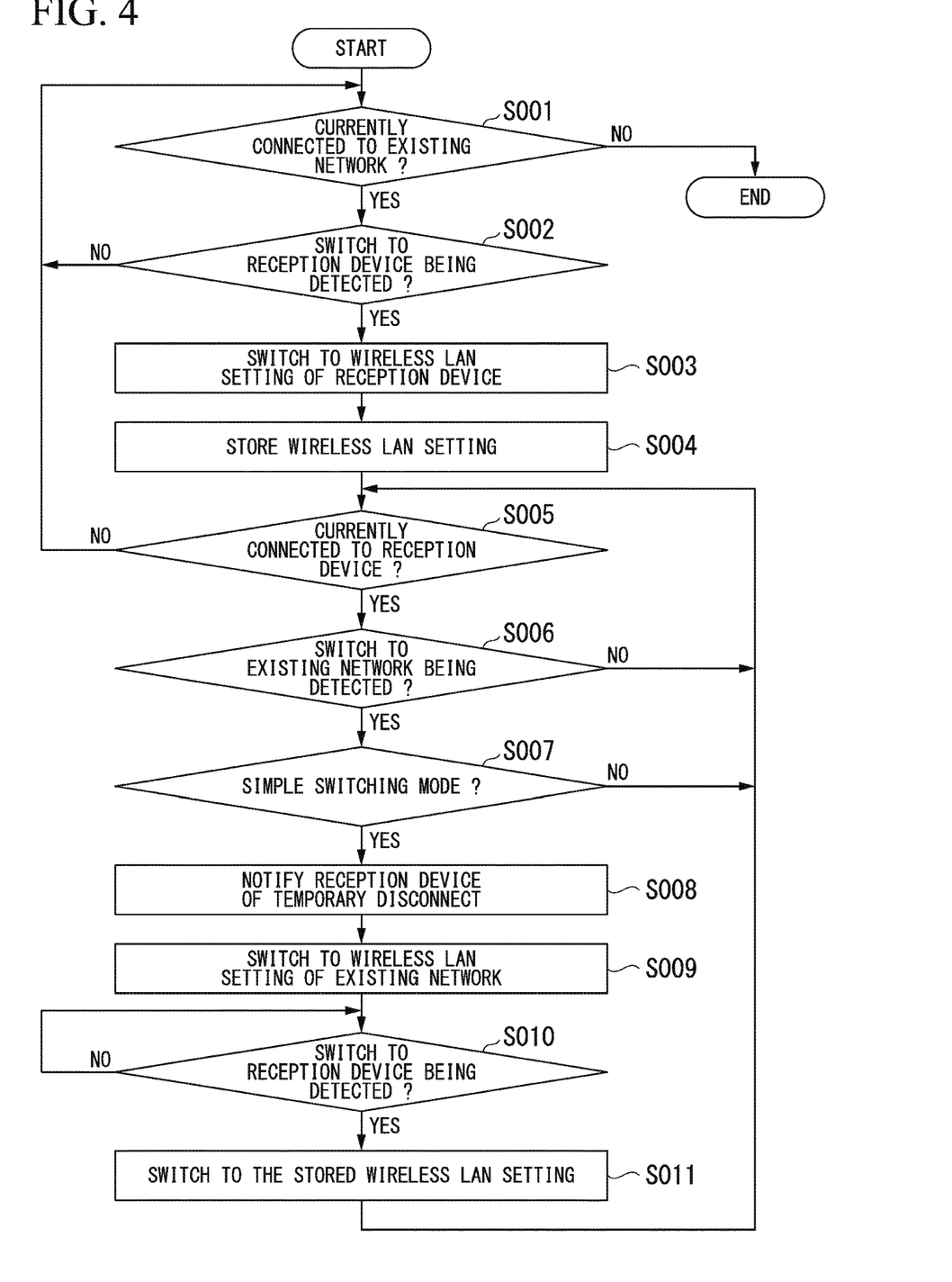
FIG. 4 is a flowchart showing the operation of the transmission device according to the first embodiment of the present invention.

FIG. 4 is a flowchart showing the operation of the transmission device 10 according to the first embodiment of the present invention. The transmission device 10 starts its operation according to the flowchart when the communication part 101 of the transmission device 10 is connected to the existing network n10 through wireless LAN n1 and the access point 30.

(Step S001) The flow proceeds to step S002 when the communication part 101 of the transmission device 10 is being connected to the existing network n10. Otherwise (i.e. when the transmission device 10 is disconnected from the existing network n10 in communication), the transmission device 10 exits the process of the flowchart.

(Step S002) The flow proceeds to step S003 when the controller 103 of the transmission device 10 detects a switching instruction to switch the connection of the transmission device 10 from the connection to the access point 30 serving as an access point of the existing network n10 to the connection to the reception device 20 serving as an access point of the communication line n20 according to the input information of the input part 104 due to a user's input operation. Otherwise, the flow returns to step S001.

(Step S003) The connection destination switch 1031 of the controller 103 of the transmission device 10 switches the connection of the transmission device 10 from the connection to the access point 30 serving as an access point of the existing network n10 to the reception device 20 serving as an access point of the communication line n20. Subsequently, the flow proceeds to step S004.

(Step S004) The write part of the controller 103 of the transmission device 10 stores a wireless LAN setting (or connection setting information), which is used for the connection to the reception device 20 serving as an access point of the communication line n20, on the storage 102. Subsequently, the flow proceeds to step S005.

(Step S005) The flow proceeds to step S006 when the communication part 101 of the transmission device 10 is being connected to the reception device 20. Otherwise (i.e. when the transmission device 10 is disconnected from the reception device 20 in communication), the flow returns to step S001.

(Step S006) The flow proceeds to step S007 when the controller 103 of the transmission device 10 detects a switching instruction to switch the connection of the transmission device 10 from the connection to the reception device 20 serving as an access point of the communication line n20 to the access point 30 serving as an access point of the existing network n10. Otherwise, the flow returns to step S005.

(Step S007) The flow proceeds to step S008 when the mode switch 1034 of the controller 103 of the transmission device 10 sets the simple switching mode to establish the connection to the reception device 20 through the wireless LAN n2 using the wireless LAN setting (i.e. the connection setting information) stored on the storage 102. Otherwise, the flow returns to step S005.

(Step S008) The notification part 1033 of the controller 103 of the transmission device 10 transmits a temporary disconnect notice to the reception device 20 through the communication part 101. Subsequently, the flow proceeds to step S009.

(Step S009) The connection destination switch 1031 of the controller 103 of the transmission device 10 switches over the connection of the transmission device 10 from the connection to the reception device 20 serving as an access point of the communication line n20 to the connection to the access point 30 serving as an access point of the existing network n10. Subsequently, the flow proceeds to step S010.

(Step S010) The flow proceeds to step S011 when the controller 103 of the transmission device 10 detects a switching instruction to switch the connection of the transmission device 10 from the connection to the access point 30 serving as an access point of the existing network n10 to the connection to the reception device 20 serving as an access point of the communication line n20 according to the input information of the input part 104 due to a user's input operation. Otherwise, the flow holds the step S010.

(Step S011) The connection destination switch 1031 of the controller 103 of the transmission device 10 switches over the connection of the transmission device 10 from the connection to the access point 30 serving as an access point of the existing network n10 to the connection to the reception device 20 serving as an access point of the communication line n20 using the wireless LAN setting (or the connection setting information) which is stored on the storage 102 in step S004. Subsequently, the flow returns to step S005.

Operation of Reception Device

Hereinafter, the operation of the reception device 20 according to the present embodiment will be described with reference to the drawing.

Figure 5:
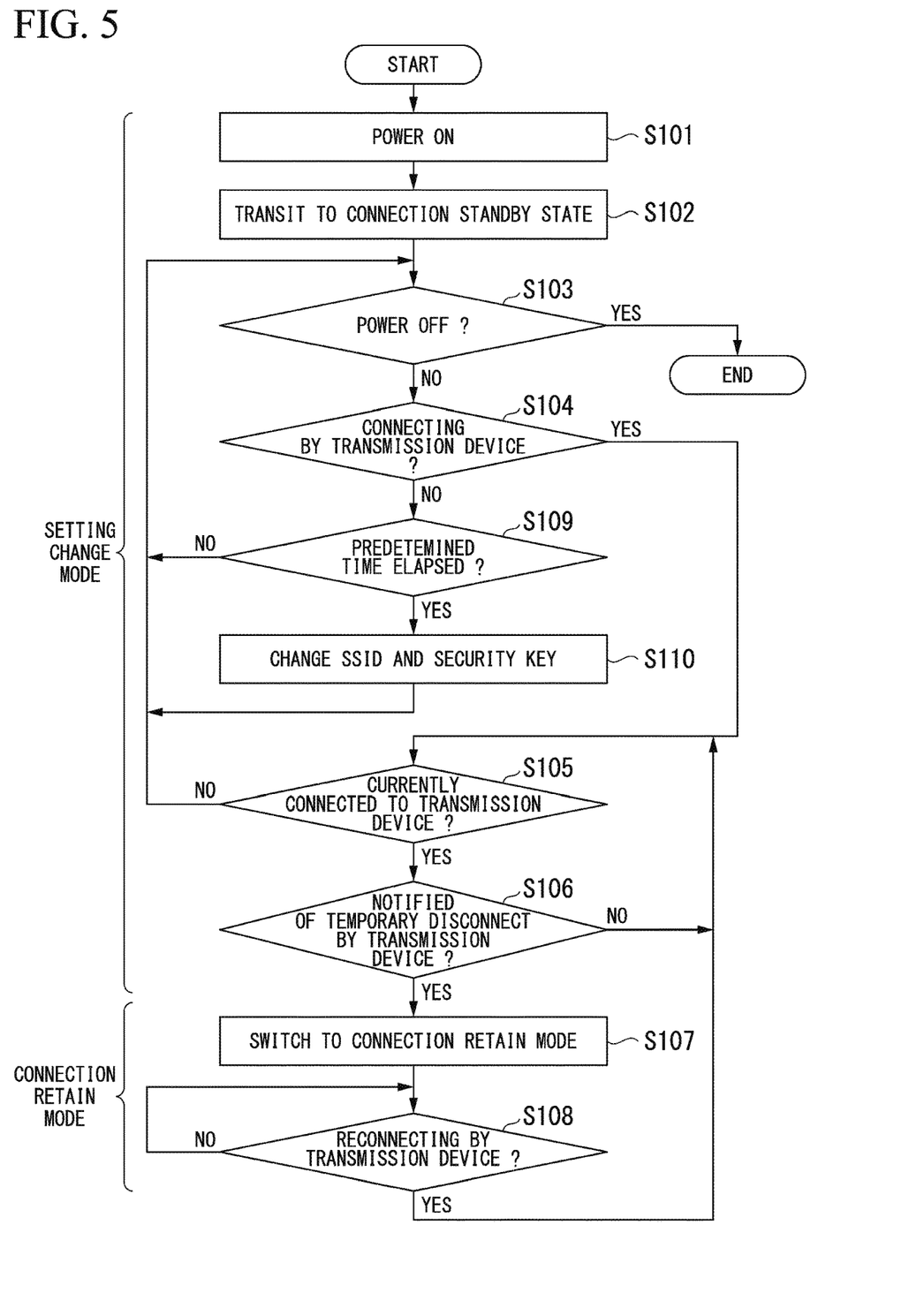
FIG. 5 is a flowchart showing the operation of the reception device according to the first embodiment of the present invention.

FIG. 5 is a flowchart showing the operation of the reception device 20 according to the first embodiment of the present invention. The reception device 20 starts its operation according to the flowchart when a power applied thereto is turned on (ON).

(Step S101) A power applied to the reception device 20 is turned on. Subsequently, the flow proceeds to step S102.

(Step S102) The communication part 201 of the reception device 20 is shifted to a connection standby state for the connection to the transmission device 10 through the wireless LSN n2. Subsequently, the flow proceeds to step S103.

(Step S103) The reception device 20 exits the process according to the flowchart when a power thereto is turned off. Otherwise, the flow proceeds to step S104.

(Step S104) The flow proceeds to step S105 when the reception device 20 is connected to the transmission device 10. Otherwise, the flow proceeds to step S109.

(Step S105) The flow proceeds to step S106 when the reception device 20 is being connected to the transmission device 10. Otherwise, the flow returns to step S103.

(Step S106) The flow proceeds to step S107 when the controller 203 of the reception device 20 receives a temporary disconnect notice transmitted thereto from the transmission device 10 through the communication part 201. Otherwise, the flow returns to step S105.

(Step S107) The controller 203 of the reception device 20 switches over its mode from the setting change mode to the connection retain mode. Subsequently, the flow proceeds to step S108.

(Step S108) The flow returns to step S105 when the reception device 20 is connected to the transmission device 10 again. Otherwise, the flow holds the step S108.

(Step S109) The flow proceeds to step S110 when a predetermined time (e.g. one hour) has elapsed without the connection to the transmission device 10 through the wireless LAN n2. Otherwise, the flow returns to step S103.

(Step S110) The controller 203 of the reception device 20 controls the generator 205 to generate a new SSID and a security key (i.e. connection setting information) and thereby execute the connection setting information change process to change the connection setting information used for the connection going through the wireless LAN n2 with new connection setting information. Subsequently, the flow returns to step S103.

As shown in FIG. 5, the operation of the reception device 20 in the setting change mode refers to a series of steps S101 through S106 and a series of steps S109 through S110. In addition, the operation of the reception device 20 in the connection retain mode refers to a series of steps S107 through S108.

As described above, the write part 1032 stores the wireless LAN setting (or the connection setting information) used for the connection to the reception device 20 serving as an access point of the communication line n20 on the storage 102 in the simple switching mode in which the connection destination switch 1031 of the controller 103 of the transmission device 10 of the present embodiment switches the connection to the access point 30 serving as an access point of the existing network n10 to the connection to the reception device 20 serving as an access point of the communication line n20. When the connection destination switch 1031 switches over the connection to the access point 30 serving as an access point of the existing network n10, the notification part 1033 transmits to the reception device 20 through the communication part 101 a temporary disconnect notice indicating temporary disconnecting the communication with the reception device 20.

The connection destination part 1031 establishes the connection to the access point of the communication line n20 using the wireless LAN setting (i.e. the connection setting information) stored on the storage 102 in the simple switching mode which is set to switch the connection to the reception device 20 serving as an access point of the communication line n20 to the connection to the access point 30 serving as an access point of the existing network n10.

Upon receiving the temporary disconnect notice through the communication part 201, the controller 203 of the reception device 20 is shifted the mode (i.e. the connection retain mode) to temporarily stop the connection setting information change process. Subsequently, the controller 203 will be shifted to the mode (i.e. the setting change mode) to execute the connection setting information change process again when the reception device 20 is connected to the transmission device 10 through the wireless LAN n2 again.

According to the aforementioned configuration of the video display system 1 of the present embodiment by which the transmission device 10 is connected to the reception device 20 serving as an access point of the communication line n20 again, it is possible for a user to simply change the connection between the reception device 20 and the existing network n10 since it is unnecessary to set the wireless LAN setting again.

Second Embodiment

Hereinafter, the second embodiment of the present invention will be described below.

The first embodiment is configured to carry out a process to switch the connection between the access point 30 through the wireless LAN n1 and the reception device 20 through the wireless LAN n2 according to a user's input operation.

Figure 6:
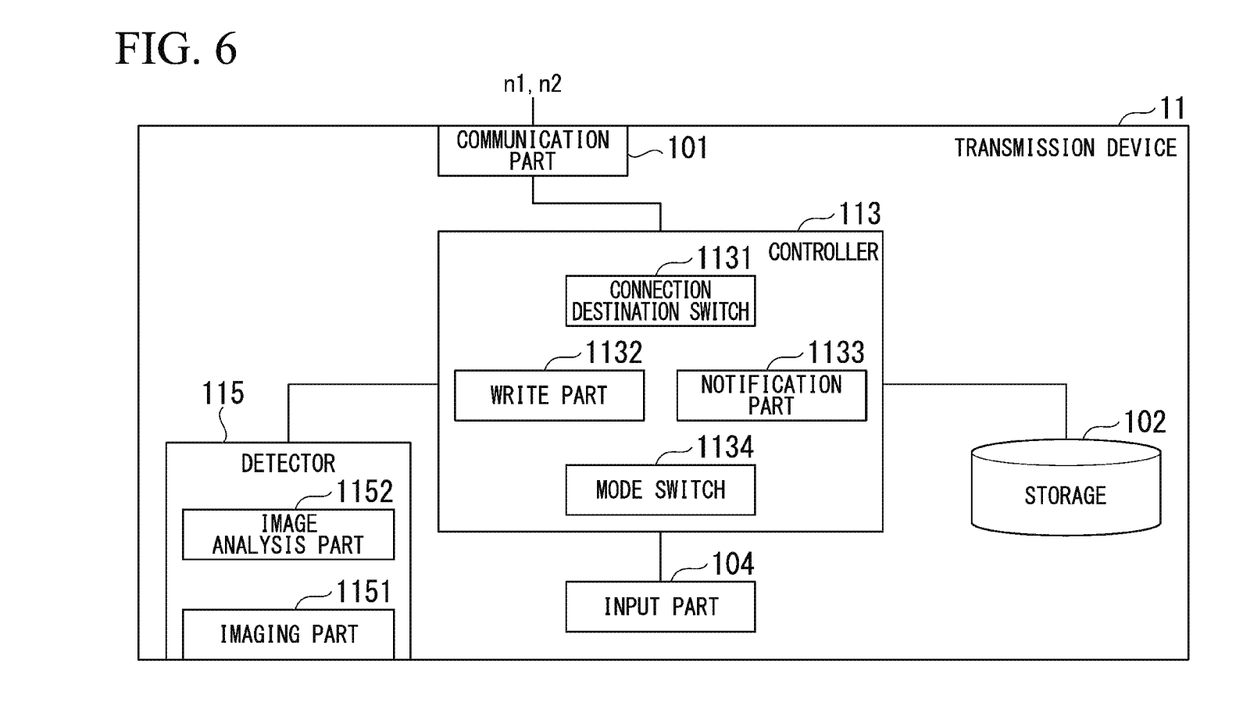
FIG. 6 is a block diagram showing the functional configuration of a transmission device according to the second embodiment of the present invention.

In contrast, the transmission device 10 of the second embodiment is equipped with a detector 115 configured to detect a direction of a user's face or a user's sight, thus switching the connection between the access point 30 through the wireless LAN n1 and the reception device 20 through the wireless LAN n2. Accordingly, it is unnecessary for a user to makes an input operation to switch the connection in the second embodiment which is designed to automatically switch over the connection, and therefore a transmission device 11 of the second embodiment is able to reduce a user's working load to switch the connection.

Functional Configuration of Transmission Device

Hereinafter, the functional configuration of the transmission device 11 of the present embodiment will be described with reference to the drawing.

FIG. 6 is a block diagram showing the functional configuration of the transmission device 11 according to the second embodiment of the present invention. As shown in FIG. 6, the transmission device 11 (or a communication device) includes the communication part 101, the storage 102, a controller 113, the input part 104, and the detector 115.

In this connection, the functional blocks like the communication part 101, the storage 102, and the input part 104 are similar to the foregoing functional blocks in the transmission device 10 of the first embodiment; hence, their descriptions will be omitted here.

The controller 113 is configured to control the functional blocks of the transmission device 11. The controller 113 carries out various processes based on control programs and control data stored on the storage 102. For example, the controller 113 may include a CPU.

In addition, the controller 113 includes a connection destination switch 1131, a write part 1132, a notification part 1133, and a mode switch 1134.

The connection destination switch 1131 is configured to switch the connection between the access point 30 serving as an access point of the existing network n10 and the reception device 20 serving as an access point of the communication line n20.

The write part 1132 writes a wireless LAN setting (or connection setting information) for establishing the connection to the reception device 20 on the storage 102 in an attempt for the communication part 101 establishes the connection to the reception device 20 serving as an access point of the communication line n20.

The notification part 1133 transmits to the reception device 20 through the communication part 101 a temporary disconnect notice to temporarily stop the connection to the reception device 20 in the simple switching mode to switch the connection from the reception device 20 serving as an access point of the communication line n20 to the access point 30 serving as an access point of the existing network n10.

In addition, the connection destination switch 1131 establishes the connection to the reception device 20 using the wireless LAN setting (or the connection setting information) stored on the storage 102 in the simple switching mode which is set to switch the connection from the access point 30 serving as an access point of the existing network n10 to the reception device 20 serving as an access point of the communication line n20.

According to an external instruction, the mode switch 1134 switch its mode between the simple switching mode to establish the connection to the reception device 20 serving as an access point of the communication line n20 using the wireless LAN setting (or the connection setting information), which the write part 1132 has written to the storage 102, and the normal connection mode to establish the connection to the reception device 20 using the wireless LAN setting which has been changed by the reception device 20 configured to change its wireless LAN setting. For example, the external instruction may be input information input by the input part due to a user's input operation on a keyboard or a mouse.

In this connection, the controller 103 controls the communication part 101 to connect to its connection destination according to the mode being switched over by the mode switch 1034 (i.e. the simple switching mode or the normal connection mode).

The connection destination switch 1131 switches over its connection destination to the access point 30 serving as an access point of the existing network n10 through the wireless LAN n1 when the detection result information output from the detector 115 indicates that the user's face or the user's sight is directed to the transmission device 11.

In addition, the connection destination switch 1131 switches over its connection destination to the reception device 20 serving as an access point of the communication line n20 through the wireless LAN n2 when the detection result information output from the detector 115 indicates that the user's face or the user's sight is not directed to the transmission device 11.

The detector 115 detects the direction of the user's face or the user's sight to output the detection result information, representing the detection result of the detector 115, to the controller 113.

The imaging part 1151 captures an image of a user's face or the like. For example, the imaging part 1151 may include a camera.

The image analysis part 1152 analyzes an image captured by the imaging part 1151 to detect the direction of a user's face or a user's sight.

In the video display system 1 of the present embodiment as described above, the transmission device 11 is configured to automatically switch its connection according to the direction of a user's face or a user's sight. Accordingly, the transmission device 11 of the present embodiment is able to simply switch its connection between the reception device 20 and the access point 30 serving as an access point of the existing network n10.

Heretofore, the present invention has been described in detail by way of the foregoing embodiments, however, the concrete configurations may not be necessarily limited to the foregoing ones; hence, it is possible to make various design changes without departing from the subject matter of the invention.

In the foregoing embodiments, all the transmission device 10, the transmission device 11, and the reception device 20 may be partly or entirely realized using computers. In this case, programs achieving control functions may be stored on computer-readable storage media, and therefore it is possible to load programs stored on storage media into computer systems, thus executing programs.

Herein, the term "computer system" may refer to computer systems embedded in the transmission device 10, the transmission device 11, and the reception device 20, wherein computer systems may include OS and hardware such as peripheral devices. In addition, "computer-readable storage media" may refer to flexible disks, magneto-optical disks, ROM, portable media such as CD-ROM, and storage devices like hard disks embedded in computer systems.

Moreover, "computer-readable storage media" may include any measures configured to dynamically store programs for a short period of time such as networks like the Internet and communication lines like telephone lines used to transmit programs as well as other measures configured to hold programs for a certain time such as non-volatile memory embedded in computer systems acting as servers or clients. The aforementioned programs may achieve part of the foregoing functions. Alternatively, the foregoing programs may achieve the foregoing function when combined with pre-installed programs of computer systems.

In the foregoing embodiments, the transmission device 10, the transmission device 11, and the reception device 20 can be embodied using integrated circuits according to LSI (Large Scale Integration) technologies. The functional blocks included in the transmission device 10, the transmission device 11, and the reception device 20 can be embodied using processors independently, or they can be partly or entirely integrated into processors. The integrated-circuitry technologies are not necessarily limited to LSI technologies; hence, it is possible to realize the functional parts using specific-purpose circuits or general-purpose processors. Due to advancement of semiconductor technologies bringing new integrated-circuitry technologies substituted for LSI technologies, it is possible to use integrated circuits according to new technologies.

Heretofore, the present invention has been described in detail by way of the embodiments with reference to the drawings, however, concrete configurations are not necessarily limited to the foregoing embodiments; hence, the present invention may include any design change without departing from the subject matter of the invention.

REFERENCE SIGNS LIST 1 video display system
10, 11 transmission device (communication device)
20 reception device
21 display device
30 access point
101, 201 communication part
102, 202 storage
103, 113, 203 controller
104 input part
115 detector
204 display output part
205 generator
1031, 1131 connection destination switch
1032, 1132 write part
1033, 1133 notification part
1034, 1134 mode switch
1151 imaging part
1152 image analysis part
2051 SSID generator
2052 security key generator

The invention claimed is:

1. A communication device comprising:
a communication interface configured to establish a connection to either a first device or a second device; and
a processor configured to control the communication interface,
wherein the processor is configured to send a predetermined notice to the second device before disconnecting the connection with the second device in a predetermined operation mode to switch the connection from the second device to the first device, but the processor is configured to not make the predetermined notice in other cases,
wherein the second device is configured to change connection setting information used for the connection with the communication device when a predetermined condition is satisfied while the connection with the communication device is disconnected, and
wherein the predetermined notice causes the second device to not change the connection setting information irrespective of the predetermined condition.

2. The communication device according to claim 1, further comprising:
an input interface configured to receive an input operation,
wherein the processor is configured to switch the connection between the first device and the second device according to the input operation in the predetermined operation mode.

3. The communication device according to claim 1, further comprising:
an image capture device configured to detect a direction of a user's face or a user's sight,
wherein in the predetermined operation mode, the processor is configured to switch the connection to the first device when the image capture device detects that the user's face or the user's sight is directed to the communication device, and
wherein the processor is configured to switch the connection to the second device when the image capture device detects that the user's face or the user's sight is not directed to the communication device.

4. The communication device according to claim 1, further comprising:
a non-transitory computer-readable storage medium configured to store the connection setting information,
wherein the communication interface is configured to establish the connection to the second device using the connection setting information stored on the non-transitory computer-readable storage medium.

5. A communication device comprising:
a communication interface configured to establish a connection to a first device, the first device being configured to establish a connection to either the communication device or a second device; and
a processor configured to change connection setting information used for the connection with the first device, when a predetermined condition is satisfied while the connection with the first device is disconnected,
wherein when the communication interface receives a predetermined notice from the first device before the connection with the first device is disconnected for the first device to switch the connection from the communication device to the second device, the processor is configured to
not change the connection setting information irrespective of the predetermined condition, or
increase a time to change the connection setting information irrespective of the predetermined condition.

6. A communication system comprising:
a communication device;
a first device, and
a second device,
wherein the communication device comprises: a communication interface configured to establish a connection to either the first device or the second device; and a processor configured to control the communication interface,
wherein the processor is configured to send a predetermined notice to the second device before disconnecting the connection with the second device in a predetermined operation mode to switch the connection from the second device to the first device, but the processor is configured to not make the predetermined notice in other cases,
wherein the first device comprises a first communication interface configured to establish a connection,
wherein the second device comprises a second communication interface configured to establish a connection; and a second processor configured to change connection setting information used for the connection with the communication device, when a predetermined condition is satisfied while the connection with the communication device is disconnected, and
wherein the second processor is configured to not change the connection setting information irrespective of the predetermined condition when the second communication interface receives the predetermined notice.

7. A communication method comprising:
establishing a connection to either a first device or a second device; and
sending a predetermined notice to the second device before disconnecting the connection with the second device in a predetermined operation mode to switch the connection from the second device to the first device, but not making the predeteimined notice in other cases,
wherein the second device is configured to change connection setting information used for the connection with the communication device when a predetermined condition is satisfied while the connection with the communication device is disconnected, wherein the predetermined notice causes the second device to not change the connection setting information irrespective of the predetermined condition.

8. A communication method comprising:

establishing a connection to a first device, the first device being configured to establish a connection to either a communication device or a second device;

changing connection setting information used for the connection with the first device, when a predetermined condition is satisfied while the connection with the first device is disconnected; and when a predetermined notice is received from the first device before the connection with the first device is disconnected for the first device to switch the connection from the communication device to the second device, not changing the connection setting information irrespective of the predetermined condition, or increasing a time to change the connection setting information irrespective of the predetermined condition.

* * * * *